Feb. 2, 1965   R. H. APPELDORN ETAL   3,167,998
PORTABLE OVERHEAD PROJECTING APPARATUS
Filed April 17, 1961   4 Sheets-Sheet 1

INVENTORS
ROGER H. APPELDORN
FRANK C. LUSTIG
BY
Carpenter, Abbott, Coulter & Kinney
ATTORNEYS

INVENTORS
ROGER H. APPELDORN
FRANK C. LUSTIG

Feb. 2, 1965  R. H. APPELDORN ETAL  3,167,998
PORTABLE OVERHEAD PROJECTING APPARATUS
Filed April 17, 1961  4 Sheets-Sheet 4
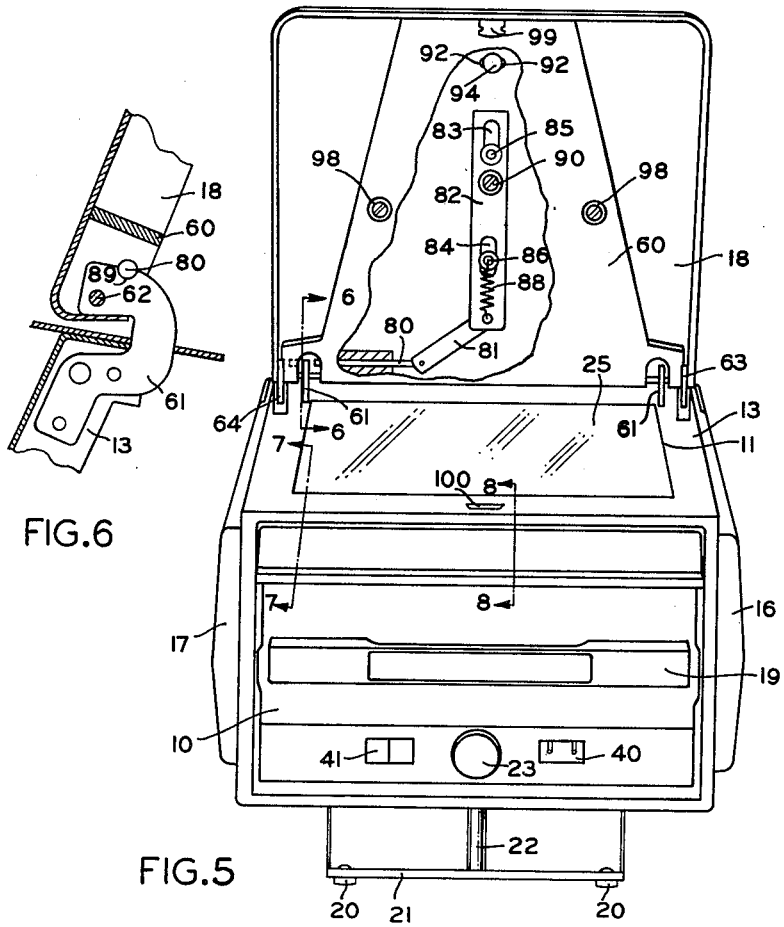
FIG.6
FIG.5
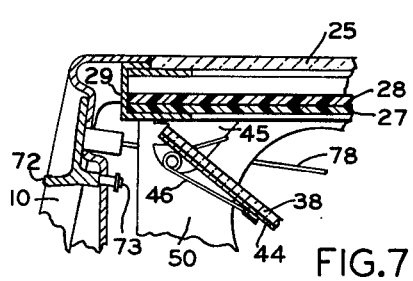
FIG.7
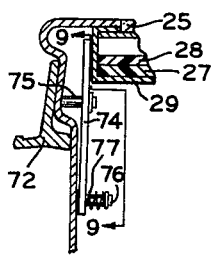
FIG.8
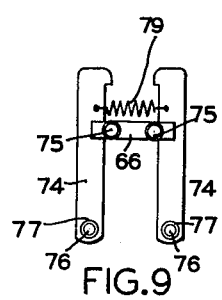
FIG.9
INVENTORS
ROGER H. APPELDORN
FRANK C. LUSTIG
BY
Carpenter, Abbott, Coulter & Kinney
ATTORNEYS

United States Patent Office 3,167,998
Patented Feb. 2, 1965

3,167,998
PORTABLE OVERHEAD PROJECTING
APPARATUS
Roger H. Appeldorn, White Bear Lake, Minn., and Frank
C. Lustig, Highland Park, Ill., assignors to Minnesota
Mining and Manufacturing Company, St. Paul, Minn.,
a corporation of Delaware
Filed Apr. 17, 1961, Ser. No. 103,487
11 Claims. (Cl. 88—24)

This invention pertains to apparatus for the projection of images from film transparencies onto a remote screen. More particularly, the present invention is concerned with apparatus which is commonly called an overhead projector, and with those overhead projectors in which the parts are contained within a carrying case which is easily lifted and carried about by a person using only one hand.

Overhead projectors are particularly useful to persons who wish to present a visual demonstration while addressing an audience, because the images are projected from the machine to the screen placed behind the speaker and the speaker can see and explain the transparency as it lies on the stage of the machine while he faces his audience. Also, since it is not necessary to diminish the normal lighting of a room in order to make the image projected by such a machine clearly visible, there is no difficulty in taking or reading notes during the visual demonstration. The slide, or other transparency containing the information which the speaker wishes to project, is placed on the stage of the machine, and the speaker can designate a particular place on the transparency, in order to emphasize it, with the result that the designator used will also be projeted, along with the image, onto the screen. Since the designators which can be used include not only various objects used as pointers, but also include the use of grease pencils to write on the transparency, in order to accent or enlarge on the topic, it is extremely desirable for the apparatus to be able to accommodate transparencies of relatively large size, so that such designators can be accurately applied.

While portable overhead projectors have been available, those machines have not been made so as to be able to accommodate transparencies of a size larger than about 7 inches by 7 inches, and, although machines which will accommodate transparencies of a size about 10 inches by 10 inches have been available, those larger machines have not been made in a size and shape so as to be conveniently transported by one person. That is, the size of the transparency which could be used on those machines has been directly proportional to the size of the machine. This has been due largely to the fact that the flat mirror which reflects the light from the lamp to the stage has been set at an angle of 45 degrees to the stage and the rays of light from the lamp, and the machines which accommodate the larger transparencies have necessarily been made larger, in order for the machine to accommodate a mirror large enough to illuminate a larger stage. The present invention provides a machine which can accommodate a mirror large enough to illuminate the larger stage properly, thus accommodating transparencies of the larger size, and is small enough to be carried about by one person.

The portable overhead projector of the present invention is a box-like case having a top wall containing an opening adjacent one end and extending across the major portion of the width of the machine so as to have an area greater than one-half of the area of the top wall. A transparent stage on which the transparency to be projected is to be placed is provided in, and co-extensive with, the opening, and a flat mirror is pivotally attached to one end of the top wall to extend downwardly under the stage at an angle of less than 45 degrees from the plane of the top wall. This smaller angle of the mirror permits the use within a thinner case of a longer mirror, and thus a larger mirror. The projection lamp is mounted within the case in a position adjacent to the top wall at the end of the case opposite from the stage and mirror, so that the lamp is in a position to direct light rays to the mirror at an angle of incidence which is less than 45 degrees, and so that the light will be reflected upwardly from the mirror in a plane which is perpendicular to the plane of the stage and top wall.

A yoke is pivotably mounted on the outside of the top wall of the case for movement from a position in substantial parallelism with the top wall and stage to an operative position at which the yoke is inclined above the stage, and a projection lens assembly is carried by the yoke in the operative position. Thus, the projection lens assembly is disposed to receive the light which is reflected upwardly through the stage by the mirror and project the light toward a remote screen. A cover is attached to the yoke in position to protect the stage when the yoke is positioned in substantial parallelism with the top wall and stage, and when the yoke is in operative position the cover serves to shield the audience from the brightly lighted stage. Releasable latch means are provided for holding the yoke and cover in the operative position when they have been moved to that position, and interlocking means are positioned for engagement by the projection lens assembly when the projection assembly is in the operative position to prevent movement of the yoke and cover toward the stage while the projection assembly is in the operative position on the yoke and cover. Means are also provided for storing the projection lens assembly within the case by moving the mirror, so that all of the parts of the machine can be carried by lifting only one compact case. The mirror is held between two strip springs when the projection lens assembly is in the storage or carrying position, thus cushioning the mirror from mechanical shock as the machine is carried about.

The object of this invention is to provide improvements in a portable overhead projector, and the advantages provided by the invention will be understood from the following detailed description of the embodiment illustrated in the accompanying drawings, in which drawings:

FIGURE 5 is a perspective view of the front of the machine, showing the cover in operative position and parts of the yoke broken away to illustrate the interlock mechanism associated therewith;

FIGURE 6 is an enlarged fragmentary vertical sectional view taken along the lines 6—6 of FIGURE 5, further illustrating the interlock mechanism;

FIGURE 7 is an enlarged fragmentary vertical sectional view taken along lines 7—7 of FIGURE 5, showing details of construction of the stage, the mirror, and the latching assembly;

FIGURE 8 is an enlarged fragmentary vertical sectional view taken along lines 8—8 of FIGURE 5, showing further details of construction of the latching assembly; and FIGURE 9 is an elevational view of part of the latching assembly taken along the line 9—9 of FIGURE 8.

Figure 1:
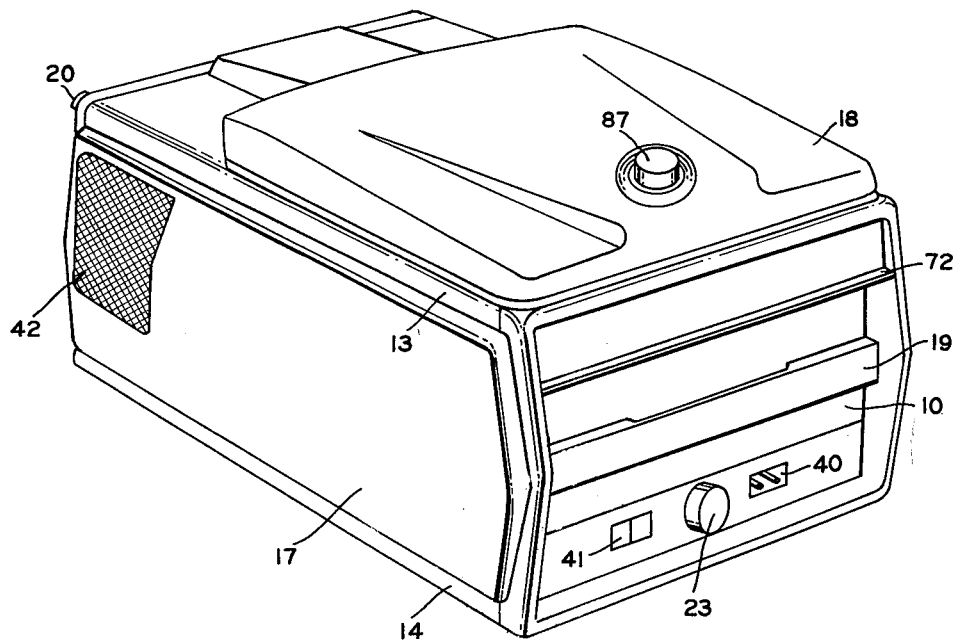
FIGURE 1 is a perspective view of the improved projector with the parts thereof in closed or carrying position, so that the entire apparatus can be easily transported.

The top plate of the machine shown in the drawings is indicated therein by the reference character 13. Top plate 13 contains an aperture 11, and the transparent stage 25 is placed into said aperture. The mirror 38 is pivotably attached to stage 25, and said mirror is postionable so as to reflect light from the lamp 31 upwardly through stage 25 to a projection lens assembly 37 when said projection lens assembly is attached to the yoke member 60. Yoke member 60 is pivotably attached by pivot pins 62 and brackets 61 to the top surface of top plate 13, and top cover 18 is attached to yoke 60. Locking arms 63 and 64 are attached to yoke 60 and said yoke and cover are held in an inclined position above stage 25 by engagement of said locking arms with latch members 68, which latch members are attached to top plate 13. The attachment of projection lens assembly 37 to yoke 60 when said yoke is held in the inclined position above stage 25 actuates the interlocking mechanism by engaging transverse locking pin 80 into a notch or recess 89 in one of the brackets 61, to prevent movement of yoke 60 toward stage 25 so long as projection lens assembly 37 is in that position. When projection lens assembly 37 is not attached to yoke 60 it can be placed in the brackets 58 in the bottom door 56 for storage, and when said door is closed, the mirror 38 is pivoted upwardly into a position parallel to stage 25 by the movement of the bottom door and said projection lens assembly.

Figure 2:
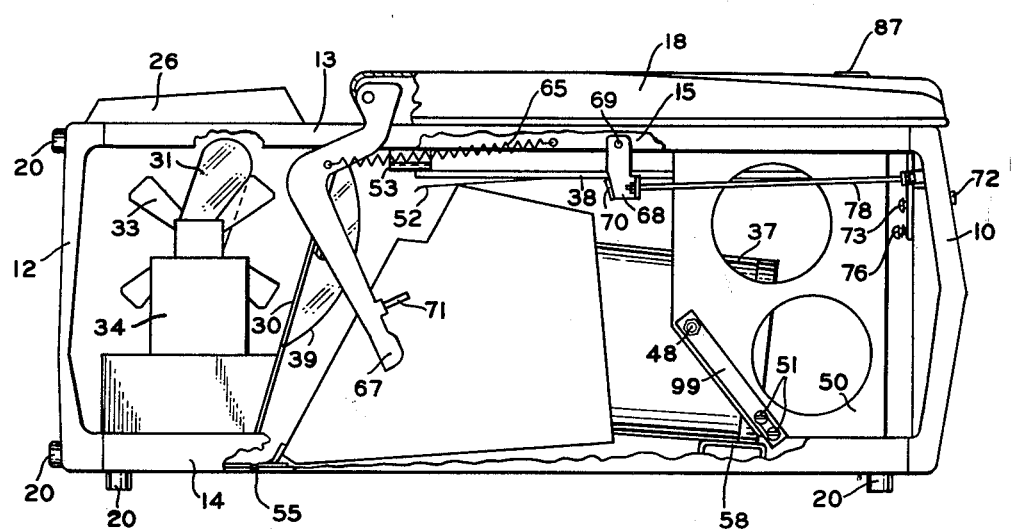
FIGURE 2 is a side elevational view of the projector shown in FIGURE 1, with the side panel removed and sections of the frame broken away to show the positioning of the shiftable parts in carrying position.

In the accompanying drawings and description of the particular embodiment shown, the end shown at the right in FIGURES 1 and 2 is called the "front" of the machine, and the end opposite from the front is called the "back" of the machine. The term "top" refers to that part of the machine which is shown to be uppermost in FIGURES 1 and 2, and the surface opposite from the top is called the "bottom" of the machine. The other two external surfaces are each called a "side" of the machine, and the terms "right" and "left" are from the point of view of an operator facing the front of the machine. Also, since certain of the parts of the machine are shiftable in position, the machine can be considered either when those parts are in the position shown in FIGURE 1 or the position shown in FIGURE 3, and those positions will be referred to as the "carrying position" and "operative (or operating) position," respectively.

Figure 4:
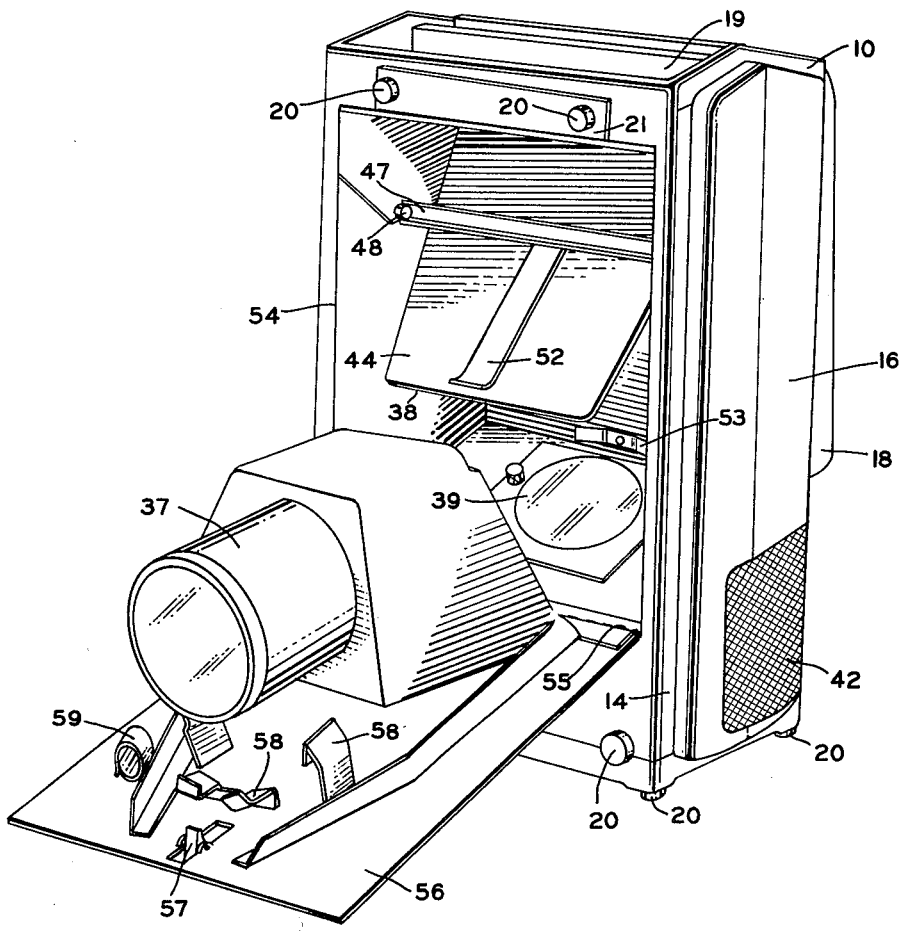
FIGURE 4 is a perspective view of the projector showing the bottom door in open position and the front of the projection head or lens assembly raised from its carrying position thereon.

Referring first to FIGURE 2, the box-like case of the machine is comprised of a front plate 10 and a back plate 12, to which are attached a top plate 13 and a bottom plate 14. Each of those plates is formed with a flange 15 on each side, and a right and left side panel 16 and 17, respectively, are attached to said flanges. Top cover 18 is provided above top plate 13, and a carrying handle 19 is attached to front plate 10. The support buttons 20 are attached to back plate 12, bottom plate 14 and to an elevator plate 21, as is shown in FIGURE 4. A spring loaded rod 22 is attached to elevator plate 21, and stabilizer bars 24 are attached to each end of said elevator plate. Rod 22 and stabilizer bars 24 project upwardly into the inside of the machine, and rod 22 is fixed in a selected position by locking means including an elevator knob 23 whereby the front of the machine can be positioned at a selected elevation, as shown in FIGURE 5, for proper direction of the projected image.

As is shown in FIGURE 5, a large square aperture 11 is provided in top plate 13, beneath top cover 18. The transparent stage 25 is a flat piece of glass, and two separate condensing fresnel lenses 27 and 28 are formed from plastic and cemented together, and said stage and said lenses are suitably mounted parallel to each other in a frame 29, as is shown in FIGURE 7. Frame 29 is suitably attached to top plate 13 so that transparent stage 25 fills the aperture 11, and is parallel to said top plate, with fresnel lenses 27 and 28 positioned under the stage. The transparency to be projected is placed on top of transparent stage 25.

Figure 3:
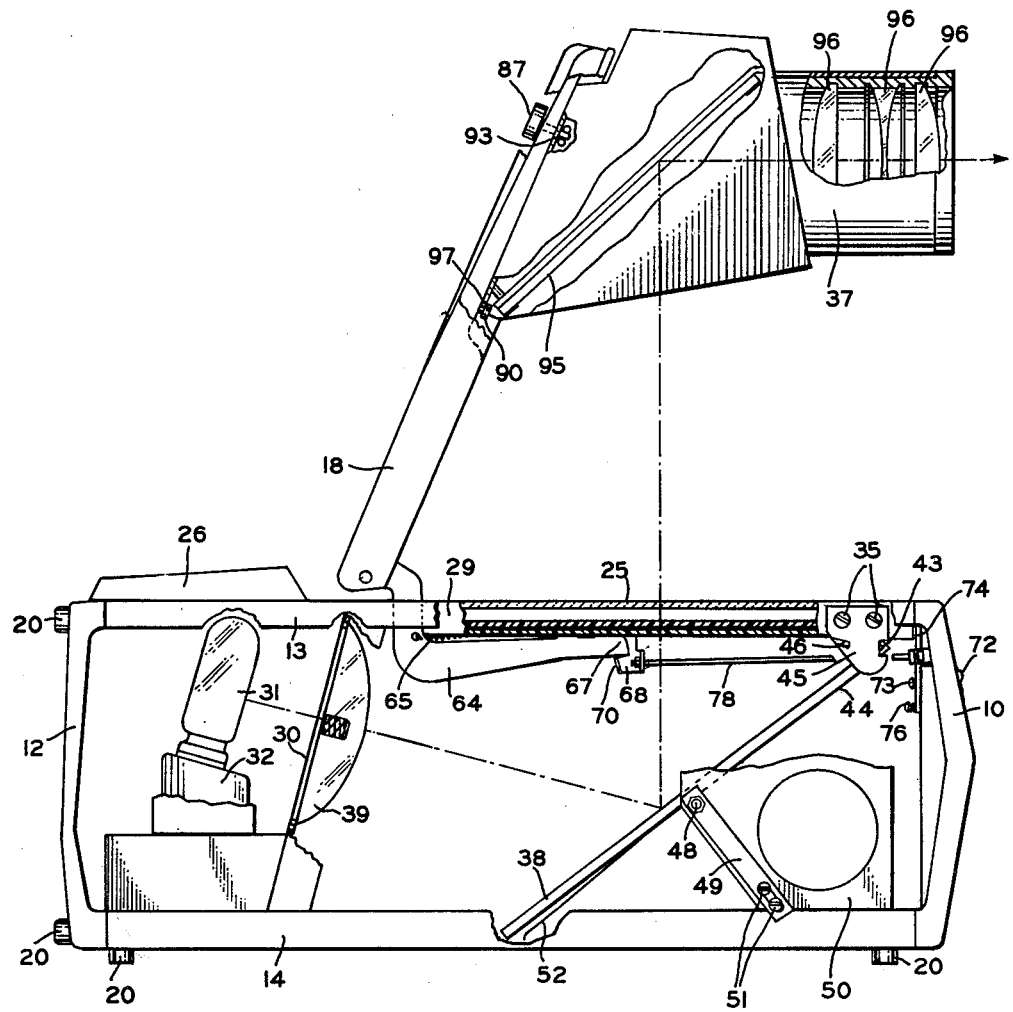
FIGURE 3 is a side elevational view similar to FIGURE 2, but showing the parts of the apparatus in operating position, parts being removed or broken away and shown in section.

The interior of the case of the machine is divided generally into two separate compartments by a transverse vertical wall 30 which is attached to top plate 13 and bottom plate 14. As is shown in FIGURES 2 and 3, wall 30 is positioned and attached so that it leans forwardly at the top. The compartment toward the rear of wall 30 houses a lamp 31 in a base 32, and a fan 33 carried by a motor 34, all of which are attached to bottom plate 14. An aperture is provided in top plate 13 in the position immediately over lamp 31, to provide means for replacing said lamp, and an access plate 26 is removably attached over said aperture. Lamp 31 contains a reflector (not shown), and lamp base 32 is formed and positioned so that said reflector directs light from lamp 31 at a slightly downward angle toward wall 30.

The compartment toward the front of wall 30 serves to house the removable projection lens assembly 37 and the mirror 38, which mirror is pivotably attached to each side of frame 29. A condensing lens 39 is mounted in a central opening through wall 30, as shown in FIGURES 3 and 4, and serves to condense light from lamp 31 as the light is directed toward mirror 38. The light is then reflected upwardly by mirror 38, toward condensing fresnel lenses 27 and 28, perpendicular to said lenses, as shown in FIGURE 3. In the embodiment illustrated in the drawings, the angle of incidence of the light from lamp 31 to mirror 38 is approximately 37 degrees, and the angle of reflection is also approximately 37 degrees from the normal to mirror 38.

Appropriate electrical wiring is provided within the case of the machine to lamp 31 and fan motor 34 from a plug entrance 40 and a switch 41 which are located on the front of the machine, as shown in FIGURE 1. The purpose of fan 33 is to cool lamp 31, and the surrounding parts of the machine, by moving air in one direction through the rear compartment. Each of the side panels 16 and 17 is provided with apertures containing a honeycomb shaped screen 42 at each side of the rear compartment, so that air traverses that compartment, and smaller suitable apertures are provided in front plate 10, so that this moving air also serves to draw air from the front compartment into the rear compartment, around the sides of wall 30, to remove heated air from the entire case of the machine. The honeycomb screens 42 are made to have a thickness of about one inch, so that they serve to provide an excellent shield for the light from the lamp while permitting the unobstructed passage of air. A suitable thermostat (not shown) is in circuit with and controls fan motor 34 to keep fan 33 running until the air inside the machine has reached a pre-determined minimum temperature after lamp 31 has been turned off by movement of switch 41.

The mirror 38 has a flat reflective surface and is carried by a supporting plate or frame 44, with the reflective surface of mirror 38 facing toward fresnel lenses 27 and 28 and transparent stage 25, said plate being pivotally attached to brackets 45 depending from frame 29 at each side of the machine. Brackets 45 are attached to frame 29 by screws 35. The pivotable mounting of plate 44 in brackets 45 is accomplished by means of ears 43 which project transversely and outwardly from the front edge of said plate, said ears being slidably held within slots in brackets 45, as shown in FIGURE 3, so that mirror 38 can be adjusted to the proper operating position. A transverse channel bar 47 is affixed to the back of mirror plate 44 and the ends thereof cooperate with a pair of lugs 48 to define the operative position of the mirror 38. The lugs 48 are carried by metal bars 49 which are adjustably mounted on the gussets 50 at each side of the interior of the machine, as by screws 51 extending through slots in said bars. The operative position of mirror 38 can be adjusted by adjusting the position of the bars 49 and lugs 48.

Means is provided for biasing mirror 38 in the operative position shown in FIGURE 3. In the illustrated machine said means takes the form of two compression springs 46 which are positioned at each side at the pivotal attachment of plate 44. One end of spring 46 is attached to the bottom surface of plate 44 and the other end of said spring is attached to bracket 45, and said spring acts to urge said plate downwardly from frame 29, as shown in FIGURE 7. Since each of the ends of compression spring 46 is attached rearwardly from the attachment of ears 43 in the slots in brackets 45, said spring also acts to urge said ears rearwardly, to hold them in said slots.

A metal strip or leaf spring 52 is suitably attached at one end to a central portion of the bottom surface of mirror plate 44 and terminates adjacent the lower edge thereof. A double ended leaf spring 53 is mounted on the under side of the top plate 13 adjacent the rearward edge of the aperture 11, as shown in FIGURES 2 and 4. Strip metal springs 52 and 53 afford cushioning of the mirror 38 during carrying of the machine as will hereinafter appear.

Referring now to FIGURE 4, it will be seen that the bottom plate 14 is formed with an opening 54, and a panel or bottom door 56 is hinged at 55 to the plate 14 at the rear edge of said opening. A latch 57 is attached to the door 56 for engagement with bottom plate 14 at the front edge of the opening 54 to releasably hold door 56 in closed position when moved thereto. A bracket assembly or cradle 58 (FIGURE 4) is mounted on the interior surface of bottom door 56, said cradle being arranged to hold a projection head or lens assembly 37 is carrying position, as is shown in FIGURE 2. A strap (not shown) or other suitable means may be provided to secure the head 37 in the cradle 58. A suitable holder 59 may be attached to bottom door 56 to provide storage for the electric service cord which attaches into plug entrance 40 when the machine is to be used.

To place the parts of the machine in carrying position, the projection lens assembly or head 37 is secured in brackets 58, and the bottom door 56 is moved toward closed position. As door 56 is closed, the head 37 engages the leaf spring 52 and pivots the mirror assembly toward the top plate 13, against the force of compression springs 46. The mirror 38 and frame 44 are thus moved to the carrying position shown in FIGURE 2, which latter position is parallel to transparent stage 25. In the carrying position of the mirror and frame, the frame 44 engages the leaf spring 53 and said mirror is protected against damage by being cushioned between strip springs 52 and 53. When bottom door 56 is subsequently opened, the mirror assembly is moved by compression springs 46 to its inclined operating position. After the projection lens assembly 37 has been removed from brackets 58, the door 56 can be closed and the machine placed in the position of FIGURE 1, in order that the projection lens assembly can be attached in operating position.

Top cover 18 is carried by a yoke member 60 which is pivotally attached to top plate 13 by means of brackets 61 (FIGURES 5 and 6) which extend upwardly from said top plate, and pivot pins 62 which extend through said brackets and said yoke. Locking arms 63 and 64 are affixed to the yoke 60 and extend downardly through apertures in top plate 13 into the interior of the machine, as is shown in FIGURE 5. Springs 65 are attached at each side of the machine to arms 63 and 64 and are suitably anchored to the top plate 13, and said springs act through said arms to urge the yoke and cover 18 toward the operating position shown in FIGURES 3 and 5.

Means are provided for releasably holding the yoke 60 and cover 18 in operative position when moved thereto. In the illustrated machine said means takes the form of a latch mechanism comprising latch members 68 pivotally attached, as by pins 69, to the under side of the top plate 13 in positions to cooperate respectively with the free ends 67 of the arms 63 and 64. The latch members 68 are formed with transversely extending latch lugs 70 which project into the path of the respective arms 63 and 74. The lugs are adapted to be moved forwardly by the rounded edge of the free ends 67 of arms 63 and 64 and are movable to latch position under said arms, as shown in FIGURE 3, upon arrival of said arms, and hence of the yoke 60 at the operative position thereof shown in said figure. The arms 63 and 64 carry spacer lugs 71 which bear against the under side of top plate 13 to define the operative position of the yoke and cover. Lugs 71 are arranged so that arms 63 and 64 are held securely in operating position by said lugs until the latch members 68 are subsequently pivoted forwardly to move the lugs 71 out of engagement with said arms upon release of said latch members.

The release of latch members 68 is controlled by a pivotably mounted rocker bar 72 which extends across the front of the machine above the handle 19 as connected at each end to one of said latch members as by rods 78. Rocker bar 72 is pivotally attached adjacent its opposite ends to the front plate 10 by bolts 73 which permit downward rocking movement of said bar from the normal raised position shown in FIGURE 7 wherein said bar bears against said front plate. The bar 72 is not movable upwardly from its normal position, and therefore said bar can normally be used as a lifting handle for the front of the machine. A suitable aperture (not shown) is provided centrally of the front plate 10 and behind said rocker bar 72, the latter being provided with stub shafts 75 which extend rearwardly through said aperture. Two generally vertically extending latch plates 74 are apertured at their lower ends to receive headed fixed pins 76 extending inwardly from the interior surface of front plate 10. The latch plates 74 are pivotal as well as axially slidable on the pins 76, and the lower ends thereof are biased toward the front plate 10 by helical compression springs 77 surrounding said pins and interposed between the heads thereof and said latch plates as shown in FIGURE 8. The stub shafts 75 extend inwardly beyond latch plates 74 and carry a rocker plate 66 at their inner ends which bears against the rear surface of said latch plates as shown in FIGURE 9. Thus, the downwardly pivotal movement of rocker bar 72 acts to pull the upper ends of the latch plates 74 forwardly, against the force of springs 77.

A tension spring 79 extends between and is attached at each end to latch plates 74 and biases said plates toward each other into engagement with the pins 75. A latch 99 is affixed to the lower surface of top cover 18, and, is adapted to pass through a suitable aperture 100 (FIGURE 5) in the top plate 13, on closure of said cover. The latch plates 74 are positioned for latching engagement with the latch 99 when said cover 18 is moved to closed position against top plate 13. The latch plates 74 are spread apart by movement of the latch 99 therebetween, and upon complete closure of the cover the spring 79 urges said plates toward each other into latching position wherein coacting shoulders on said plates and on latch 99 are interposed to hold the cover closed. Subsequent depression of the rocker bar 72, through pins 75 and plate 66, causes forward movement of the upper ends of the latch plates 74 out of engagement with the latch 99 for release of the cover 18. Thus, when cover 18 is closed, the downward movement of rocker bar 72 will release latch 99, and springs 65 will cause top cover 18 and yoke 60 to be raised toward the operating position. When said cover and yoke are in operating position, the downward movement of rocker bar 72 will release arms 63 and 64 from latch members 68, so that cover 18 and yoke 60 can be lowered to carrying position.

As shown in FIGURE 3, the projection lens assembly 37 is attached to yoke 60 when in operating position, and since the springs 65 are not strong enough to by themselves hold said yoke and said head in operative position, means are provided to prevent collapse of the yoke and damage to the machine if the rocker bar 72 is inadvertently moved downwardly while the projection lens assembly is attached to yoke 60. In the illustrated machine this means takes the form of an interlock mechanism shown most clearly in FIGURES 5 and 6, and includes a transverse locking pin 80, a link 81 and a slide bar 82, all of which are housed within yoke 60. The left hand yoke mounting bracket 61 is provided along the upper surface thereof with a semi-circular notch or recess 89, and the locking pin 80 is axially slidable in a suitable transverse bore in the yoke 60 to a locking position within said notch when the yoke is positioned in operating position. Pin 80 is pivotally attached to one end of link 81, and the other end of said link is pivotally attached to bar 82. Bar 82 is formed to contain interior slots 83 and 84 extending lengthwise of said bar, and two stubs shafts 85 and 86 confine said bar to longitudinal movement.

Stub shafts 85 and 86 are affixed to the interior surface of yoke 60. A spring 88 is attached at one end to the stub shaft 86, and the other end of said spring is attached to bar 82 as shown. Thus, spring 88 acts to urge bar 82 upwardly (in FIGURE 5), and, through link 81, acts to urge pin 80 away from the bracket 61 toward the withdraw position shown in FIGURE 5.

A headed pin 90 is affixed to the bar 82, and projects through a suitable aperture in the yoke 60. Unheaded pins 98 are affixed to the inner surface of yoke 60. The head of the pin 90 is spaced from the inner surface of the yoke 60 and the lower edge of the rear wall of the projection lens assembly 37 is formed with a slot 97 to receive the shank of said pin. Upon mounting the assembly 37 in operative position on the yoke 60, the shank of the pin 90 is engaged within the slot 97 and said pin and bar 82 are moved downwardly thereby against the force of spring 88, causing the locking pin 80 to move into the notch 89 in left hand bracket 61. This disposition of the locking pin 80 in the notch 89 serves to prevent movement of the yoke 60 relative to said bracket 61 and thereby prevents any movement of said yoke and the cover 18 so long as the assembly 37 is in operative position, even though the rocker bar 72 may be inadvertently actuated to release the latch members 68. Unheaded pins 98 serve to aid in supporting the lower edge of the rear wall of projection lens assembly in operative position on the yoke 60.

A key 94 rotatably extends through both the cover 18 and yoke 60 and is provided with a knob 87 fixed to the end thereof above the cover. The inner end of the key 94 is provided with projection lugs 92. Projection lens assembly 37 contains a key-hole shaped aperture 93 on the rear wall thereof, which aperture is disposed to accommodate the key 94 when said assembly is in the operative position shown in FIGURE 3, wherein it holds interlock pin 90 in the depressed position shown. The lugs 92 on key 94 are shaped to pass through the key-hole shaped aperture 93 when said lugs are aligned with said aperture, but said lugs will not pass through said aperture when they are not so aligned. Thus, projection lens assembly 37 is secured to the yoke 60 by turning knob 87 after lugs 92 have passed through the aperture 93.

Projection lens assembly 37 includes a housing containing a reflecting mirror 95 and projection lenses 96. Lenses 96 are movable within housing 98 to focus the image which is reflected by mirror 95 and projected from the machine by said lenses. Mirror 95 is affixed at a 45° angle to the axes of the projection lenses 96, so that the light reflected by mirror 38 upwardly through condensing fresnel lenses 27 and 28 and transparent stage 25 to mirror 95 is reflected at 90° by mirror 95 through projection lenses 96. The operator can adjust the position of the image projected by the machine to the remote screen by raising or lowering the front of the machine and maintain it in the desired position by turning elevator knob 23 to lock rod 22 on elevator plate 21.

Thus, it is seen that the embodiment of our invention which has been illustrated and described herein contains many improvements in the construction and operation of portable overhead projectors. Our invention provides a machine having a stage of such size that it occupies the major portion of one of the largest surfaces of the case for the machine, so that the complete image from a transparency of larger size can be projected by the machine, while the size of the machine itself is small enough to be carried by a person using only one hand. This has been accomplished through the use of a flat mirror inside the case of the machine which is large enough to reflect sufficient light to illuminate a stage of a size of about 10 inches by 10 inches, but positioning that mirror at an angle of less than 45 degrees to the stage, so that the case of the machine need not be as deep as the previous machines which position the mirror at 45 degrees to the stage. The lamp is positioned to direct light rays at an angle of incidence of less than 45 degrees to the mirror, so that the total angle between the incident ray and the reflected ray of light to and from the mirror is less than 90 degrees, but the light is directed toward the stage perpendicularly to the plane of the stage, from the mirror. A machine of the present invention can also contain our novel arrangement of the parts of the machine, including the novel latch and interlocking means, to provide both convenience and safety in an overhead projector of portable size.

As is evident from the above description of an embodiment of our invention, variations in the operation and various modifications of our machine can be envisioned. For example, the stage can be pivotally attached to the top wall along the rear edge thereof and be movable downwardly into the machine, carrying the mirror along with it until the mirror rests on the inside of the bottom wall, so that projection lens assembly can remain attached to the yoke and be moved into the inside of the machine when the yoke is moved to the carrying position. Such variations, embodying some or all of the novel features herein are comprehended, and we do not intend to be limited only to the specific embodiment herein described, but, rather, we intend to be limited only by our disclosure taken as a whole, including the appended claims.

We claim:

1. A portable overhead projector comprising a box-like case having a top wall formed with an opening adjacent one end extending across the major portion of the width thereof and having an area greater than half the area of said top wall, a transparency stage co-extensive with said opening, a flat mirror within said case extending from adjacent said one end of said top wall downwardly under said stage at an angle of less than 45 degrees from the plane of said top wall, a projection lamp mounted within said case adjacent the opposite end of said top wall in position to direct light rays at said mirror at an angle of incidence less than 45 degrees, a yoke movably mounted on said case and having an operative position inclined above said stage, said yoke also having a second position in substantial parallelism with said top wall, and a projection lens assembly carried by said yoke in operative position above said stage when said yoke is in operative position, said lens assembly when in said operative position being disposed to receive light from said lamp reflected through said stage by said mirror for projection toward a remote screen.

2. A portable overhead projector comprising a box-like case having a top wall formed with an opening adjacent one end extending across the major portion of the width thereof and having an area greater than half the area of said top wall, a transparency stage co-extensive with said opening, a movably mounted flat mirror within said case having an operative position wherein it extends from adjacent said one end of said top wall downwardly under said stage at an angle of less than 45 degrees from the plane of said top wall, said mirror being movable to a second position in substantial parallelism with said top wall to provide a storage space within said case, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, and a projection lens assembly carried by said yoke in operative position above said stage when said yoke is in operative position, said lens assembly when in said operative position being disposed to receive light from said lamp reflected through said stage by said mirror for projection toward a remote screen, said lens assembly also being alternatively positionable within said storage space upon movement of said mirror to its said second position.

3. A portable overhead projector comprising a box-like case having a top wall formed with an opening adjacent one end extending across the major portion of the width thereof and having an area greater than half the area of said top wall, a transparency stage co-extensive with said opening, a flat mirror pivotably mounted at one edge within said case and having an operative position wherein it extends from adjacent said one end of said top wall downwardly under said stage at an angle of less than 45 degrees from the plane of said top wall, means for biasing said mirror toward said operative position, said mirror being movabble against said biasing means to a second position in substantial parallelism with said top wall and subjacent said stage to provide a storage space within said case, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, and a projection lens assembly carried by said yoke in operative position above said stage when said yoke is in operative position, said lens assembly when in said operative position being disposed to receive light from said lamp reflected through said stage by said mirror for projection toward a remote screen, said lens assembly also being alternatively positionable within said storage space upon movement of said mirror to its said second position.

4. A portable overhead projector comprising a box-like case having a top wall formed with an opening adjacent one end extending across the major portion of the width thereof and having an area greater than half the area of said top wall, a transparecy stage co-extensive with said opening, a flat mirror pivotably mounted at one edge within said case and having an operative position wherein it extends from adjacent said one end of said top wall downwardly under said stage at an angle of less than 45 degrees from the plane of said top wall, means for biasing said mirror toward said operative position, said mirror being movable against said biasing means to a second position in substantial parallelism with said top wall and subjacent said stage to provide a storage space within said case, said case having a bottom wall provided with an opening for access to said storage space, a door for said bottom wall opening, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, a projection lens assembly removably mounted on said yoke in operative position above said stage when said yoke is in operative position, said lens assembly when in said operative position being disposed to receive light from said lamp reflected through said stage by said mirror for projection toward a remote screen, and means for alternatively mounting said lens assembly on said bottom door for disposition thereof within said storage space when said door is closed, said mirror being held in said second position by engagement of said lens assembly therewith when the latter is disposed in said storage space.

5. A portable overhead projecting machine comprising a box-like case having a top wall and having a yoke member pivotably attached to the top wall for movement between a first position in which said member overlays said top wall and a second position in which said member extends upwardly from said top wall, releasable latch means for holding said member in said second position when moved thereto, a projection lens assembly adapted to be removably mounted in operative position on said member when the latter is in its said second position, and interlocking means positioned for engagement by said projection lens assembly when the latter is in operative position for preventing movement of said member from said second position toward said first position so long as said projection lens assembly is in operative position on said member.

6. A portable overhead projecting machine comprising a box-like case having a top wall and having a yoke member pivotably attached to the top wall for movement between a first position in which said member overlays said top wall and a second position in which said member extends upwardly from said top wall, releasable latch means for holding said member in said second position when moved thereto, a projection lens assembly adapted to be removably mounted in operative position on said member when the latter is in its said second position, inter-locking means positioned for engagement by said projection lens assembly when the latter is in operative position for preventing movement of said member from said second position toward said first position so long as said projection lens assembly is in operative position on said member, and a combination handle and release member operatively associated with said latch means, said member having a normal raised position in which it may be used as a lifting handle, said member also being manually depressable from said normal position to effect release of said latch means.

7. A portable overhead projector comprising a box-like case having a top wall formed with an opening adjacent one end extending across the major portion of the width thereof and having an area greater than half the area of said top wall, a transparency stage co-extensive with said opening, a flat mirror within said case extending from adjacent said one end of said top wall downwardly under said stage at an angle of less than 45 degrees from the plane of said top wall, a projection lamp mounted within said case adjacent the opposite end of said top wall in a position to direct light rays at said mirror at an angle of incidence less than 45 degrees, a yoke movably mounted on said case and having an operative position inclined above said stage, said yoke also having a second position in substantial parallelism with said top wall, releasable latch means for holding said yoke in said operative position when moved thereto, a projection lens assembly adapted to be removably mounted in operative position above said stage when said yoke is in operative position, interlocking means positioned for engagement by said projection lens assembly when the latter is in operative position for preventing movement of said yoke from said operative position toward said first position so long as said projection lens assembly is in operative position on said yoke, said lens assembly when in said operative position being disposed to receive light from said lamp reflected through said stage by said mirror for projection toward a remote screen.

8. A portable overhead projector comprising a box-like case having a top wall formed with an opening adjacent one end extending across the major portion of the width thereof and having an area greater than half the area of said top wall, a transparency stage co-extensive with said oepning, a movably mounted flat mirror within said case having an operative position wherein it extends from adjacent said one end of said top wall downwardly under said stage at an angle of less than 45 degrees from the plane of said top wall, said mirror being movable to a second position in substantial parallelism with said top wall to provide a storage space within said case, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, releasable latch means for holding said yoke in said operative position when moved thereto, a projection lens assembly adapted to be removably mounted in operative position above said stage when said yoke is in operative position, inter-locking means positioned for engagement by said projection lens assembly when the latter is in operative position for preventing movement of said yoke from said operative position toward said first position so long as said projection lens assembly is in operative position on said yoke, said lens assembly when in said operative position being disposed to receive light from said lamp reflected through said stage by said mirror for projection toward a remote screen, said lens assembly also being alternatively positionable within said storage space upon movement of said mirror to its said second position.

9. A portable overhead projector comprising a box-like case having a top wall formed with an opening adjacent one end extending across the major portion of the width thereof and having an area greater than half the area of said top wall, a transparency stage co-extensive with said opening, a flat mirror pivotably mounted at one edge within said case and having an operative position wherein it extends from adjacent said one end of said top wall downwardly under said stage at an angle of less than 45 degrees from the plane of said top wall, means for biasing said mirror toward said operative position, said mirror being movable against said biasing means to a second position in substantial parallelism with said top wall and subjacent said stage to provide a storage space within said case, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, releasable latch means for holding said yoke in said operative position when moved thereto, a projection lens assembly adapted to be removably mounted in operative position above said stage when said yoke is in operative position, inter-locking means positioned for engagement by said projection lens assembly when the latter is in operative position for preventing movement of said yoke from said operative position toward said first position so long as said projection lens assembly is in operative position on said yoke, said lens assembly when in operative position being disposed to receive light from said lamp reflected through said stage by said mirror for projection toward a remote screen, said lens assembly also being alternatively positionable within said storage space upon movement of said mirror to its second position.

10. A portable overhead projector comprising a box-like case having a top wall formed with an opening adjacent one end extending across the major portion of the width thereof and having an area greater than half the area of said top wall, a transparency stage co-extensive with said opening, a flat mirror pivotably mounted at one edge within said case and having an operative position wherein it extends from adjacent said one end of said top wall downwardly under said stage at an angle of less than 45 degrees from the plane of said top wall, means for biasing said mirror toward said operative position, said mirror being movable against said biasing means to a second position in substantial parallelism with said top wall and subjacent said stage to provide a storage space within said case, said case having a bottom wall provided with an opening for access to said storage space, a door for said bottom wall opening, a projection lamp mounted within said case adjacent the opposite end of said top wall in a position to direct light rays at said mirror at an angle of incidence less than 45 degrees when said mirror is in its operative position, a yoke movably mounted on said case and having an operative position inclined above said stage, said yoke also having a second position in substantial parallelism with said top wall, releasable latch means for holding said yoke in said operative position when moved thereto, a projection lens assembly removably mounted on said yoke in operative position above said stage when said yoke is in operative position, inter-locking means positioned for engagement by said projection lens assembly when the latter is in operative position for preventing movement of said yoke from said operative position toward first position so long as said projection lens assembly is in operative position on said yoke, said lens assembly when in said operative position being disposed to receive light from said lamp reflected through said stage by said mirror for projection toward a remote screen and means for alternatively mounting said lens assembly on said bottom door for disposition thereof within said storage space when said door is closed, said mirror being held in said second position by engagement of said lens assembly therewith when the latter is disposed in said storage space.

11. A portable overhead projector comprising a box-like case having a top wall formed with an opening adjacent one end extending across the major portion of the width thereof and having an area greater than half the area of said top wall, a transparency stage co-extensive with said opening, a flat mirror pivotably mounted at one edge within said case and having an operative position wherein it extends from adjacent said one end of said top wall downwardly under said stage at an angle of less than 45 degrees from the plane of said top wall, means for biasing said mirror toward said operative position, said mirror being movable against said biasing means to a second position in substantial parallelism with said top wall and subjacent said stage to provide a storage space within said case, said case having a bottom wall provided with an opening for access to said storage space, a door for said bottom wall opening, a projection lamp mounted within said case adjacent the opposite end of said top wall in a position to direct light rays at said mirror at an angle of incidence less than 45 degrees when said mirror is in operative position, a yoke movably mounted on said case and having an operative position inclined above said stage, said yoke also having a second position in substantial parallelism with said top wall, releasable latch means for holding said yoke in said operative position when moved thereto, a combination handle and release member operatively associated with said latch means, said member having a normal raised position in which it may be used as a lifting handle, said member also being manually depressable from said normal position to effect release of said latch means, a projection lens assembly removably mounted on said yoke in operative position above said stage when said yoke is in operative position, inter-locking means positioned for engagement by said projection lens assembly when the latter is in operative position for preventing movement of said yoke from said operative position toward said first position so long as said projection lens assembly is in operative position on said yoke, said lens assembly when in said operative position being disposed to receive light from said lamp reflected through said stage by said mirror for projection toward a remote screen, and means for alternatively mounting said lens assembly on said bottom door for disposition thereof within said storage space when said door is closed, said mirror being held in said second position by engagement of said lens assembly therewith when the latter is disposed in said storage space.

References Cited in the file of this patent
UNITED STATES PATENTS

| | | |
|---|---|---|
| 2,767,611 | Fitzgerald | Oct. 23, 1956 |
| 2,863,356 | Goldberg | Dec. 9, 1958 |
| 2,979,986 | Miller | Apr. 18, 1961 |